(12) United States Patent
Aradachi et al.

(10) Patent No.: US 7,064,523 B2
(45) Date of Patent: Jun. 20, 2006

(54) BATTERY CHARGER CAPABLE OF ACCURATELY DETECTING BATTERY TEMPERATURE FOR FULL CHARGE DETERMINATION

(75) Inventors: Takao Aradachi, Hitachinaka (JP); Hidekazu Harada, Hitachinaka (JP); Kenrou Ishimaru, Hitachinaka (JP); Nobuhiro Takano, Hitachinaka (JP); Takeshi Takeda, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/892,183

(22) Filed: Jul. 16, 2004

(65) Prior Publication Data
US 2005/0017691 A1    Jan. 27, 2005

(30) Foreign Application Priority Data
Jul. 18, 2003  (JP)  ............ P2003-199333

(51) Int. Cl.
H02J 7/04 (2006.01)
(52) U.S. Cl. .................................... 320/150
(58) Field of Classification Search ............ 320/150, 320/153, 151
See application file for complete search history.

(56) References Cited

U.S. PATENT DOCUMENTS
6,114,839 A * 9/2000 Takano et al. .............. 320/150

FOREIGN PATENT DOCUMENTS
JP           6-113475         4/1994

* cited by examiner

Primary Examiner—Pia Tibbits
(74) Attorney, Agent, or Firm—Antonelli, Terry, Stout and Kraus, LLP.

(57) ABSTRACT

A battery charger for charging a battery pack having a battery, a temperature sensor for sensing a temperature of the battery, and a battery terminal. The battery charger includes a charger terminal to which the battery terminal is connected when the battery is charged, a charge current generating circuit that generates a charge current for charging the battery, a battery temperature detector, and a controller. The battery temperature detector is configured to include a circuit, for example, to detect a temperature of the battery while cooperating with the temperature sensor and to output a temperature signal indicative of the temperature of the battery. The controller which is supplied with the temperature signal from the battery temperature detector, corrects the temperature signal, and provides a corrected temperature signal.

24 Claims, 5 Drawing Sheets

BATTERY CHARGER CAPABLE OF ACCURATELY DETECTING BATTERY TEMPERATURE FOR FULL CHARGE DETERMINATION

BACKGROUND OF THE INVENTION

1. Field of the Invention

The present invention relates to a battery charger for charging secondary batteries, such as nickel-cadmium batteries and nickel-hydrogen batteries.

2. Description of the Related Art

Battery packs accommodating therein a nickel-cadmium battery or a nickel-hydrogen battery are used as power sources for a various kinds of portable devices, such as a cordless power tool. The battery pack for the cordless power tool typically accommodates a temperature sensor along with the battery. Battery temperatures detected by the temperature sensor are used to determine the full charge condition of the battery.

Japanese Patent Application Publication No. HEI-6-113475 discloses a dT/dt detection method for determining the full charge condition using the detected battery temperatures. Specifically, while detecting the battery temperature at every sampling time with the use of the temperature sensor, a battery temperature gradient (hereinafter abbreviated to "BTG") is computed each time the battery temperature is detected based on the newly and previously detected battery temperatures. The battery is determined to be full charge when the currently computed BTG value is larger by a predetermined value than the minimum BTG value.

The battery packs are removed from the portable device when the battery runs low, charged with a battery charger, and subsequently reloaded into the portable device. The series of operations as described above are repeated multiple times as far as the cycle service life of the battery pack permits. However, the repetitive loading of the battery pack into and removal from the portable device abrades the contacts of battery pack, or else the contacts are corroded as a result of secular change. Abrasion or corrosion of the contacts increases contact resistance. The same is true with respect to the terminals of battery charger, which are in electrical connection with the contacts of battery pack.

The battery pack has positive and negative terminals to be connected to the battery terminals. Also the battery pack has a temperature measurement terminal to be connected to a temperature sensing terminal at the side of the battery charger. A voltage developed across the temperature sensor is applied to the battery charger through the contact of the temperature measurement terminal and the temperature sensing terminal. Amongst the three terminals of the battery pack, the negative terminal is used as a common terminal of the temperature sensor and the battery. When the battery pack is charged while connecting its positive and negative terminals to the corresponding battery terminals, a contact voltage Vc is induced due to contact resistance existing in a contact area of the two terminals. The voltage on the battery side terminal is higher than the voltage on the charger side terminal. The output voltage from the temperature sensing terminal is higher than a real value due to the contact resistance Vc.

Switching the charge current during the charging operation changes the contact voltage, which in turn changes the output voltage from the temperature sensor. Accordingly, switching the charge current results in a virtual big temperature change. Hence, the computed BTG value may erroneously indicates that the battery pack has reached a full charge condition.

SUMMARY OF THE INVENTION

In view of the foregoing, it is an object of the invention to provide a battery charger that eliminates the aforementioned drawbacks accompanying the conventional battery chargers and ensures accurate full charge determination even if contact conditions between the battery pack terminal and the charger terminal are degraded due to secular change.

In order to achieve the above and other objects, there is provided a battery charger for charging a battery pack. The battery pack has a battery, a temperature sensor for sensing a temperature of the battery, and a battery terminal. Basically, the battery charger includes a charger terminal, a charge current generating circuit, a battery temperature detector, and a controller. The battery terminal is connected to the charger terminal when the battery is charged. The charge current generating circuit generates a charge current for charging the battery. The battery temperature detector detects a temperature of the battery while cooperating with the temperature sensor and outputs a temperature signal indicative of the temperature of the battery. The controller is supplied with the temperature signal from the battery temperature detector, corrects the is temperature signal, and provides a corrected temperature signal. The corrected temperature signal is substantially free from influence of contact resistance yielded in a contact portion of the battery terminal and the charger terminal.

The battery charger may further include a charge current control circuit. The charge control circuit changes the level of the charge current. From the practical point of view, it is desirable that the controller correct the temperature signal when the charge current control circuit changes the level of the charge current to another level. When the level of the charge current is switched during charging, the battery temperature signal is influenced by the contact resistance yielded in the contact portion of the battery terminal and the charger terminal. The battery temperature signal does not exhibit an accurate temperature of the battery if influenced by the contact resistance.

It is preferable that the controller corrects the temperature signal using a correction value obtained from a first temperature signal detected by the battery temperature detector before the charge current control circuit changes the level of the charge current and a second temperature signal detected by the battery temperature detector after the charge current control circuit changes the level of the charge current. In this case, the correction value is equivalent to a value obtained by subtracting the first temperature signal from the second temperature signal.

The temperature signals detected by the battery temperature detector before the charge current control circuit changes the level of the charge current may not be corrected.

The controller computes a battery temperature gradient based on two signals selected from the corrected temperature signals and temperature signals and determines that the battery has reached a full charge condition based on the computed battery temperature gradient.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENTS

A preferred embodiment of the invention will be described while referring to the accompanying drawings.

Figure 1:
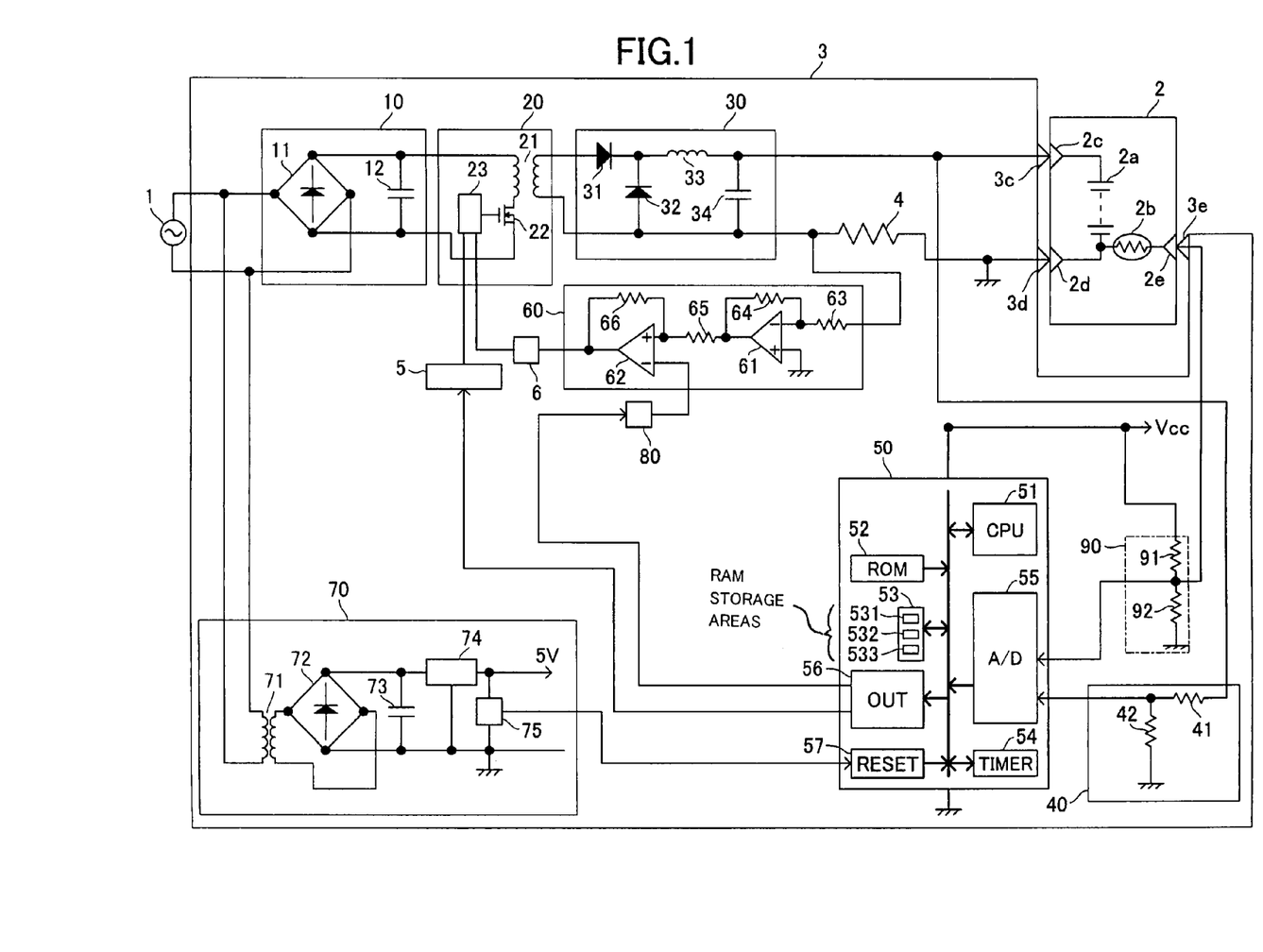
FIG. 1 is an electrical circuit arrangement of a battery charger and a battery pack according to a preferred embodiment of the present invention.

FIG. 1 shows an electrical circuit arrangement of a battery charger and a battery pack according to the preferred embodiment of the invention. As shown, the battery pack 2 includes a chargeable battery 2a, and a temperature sensor 2b. The battery 2a is composed of a plurality of battery cells connected in series. The temperature sensor 2b is disposed adjacent to or in contact with the battery 2a. A thermistor is, for example, used as the temperature sensor 2b. The battery pack 2 has a positive terminal 2c, a negative terminal 2d, and a temperature measurement terminal 2e amongst which the negative terminal 2d is used as a common terminal of the battery 2a and the temperature sensor 2b.

The battery charger 3 has a positive terminal 3c, a negative terminal 3d, and a battery temperature sensing terminal 3e which are connected to the positive terminal 2c, the negative terminal 2d, and the temperature measurement terminal 2e of the battery pack 2, respectively, when the battery pack 2 is loaded into the battery charger 3.

The battery charger 3 is a computer-controlled device incorporating therein a microcomputer 50. The microcomputer 50 includes a central processing unit (CPU) 51, a read-only memory (ROM) 52, a random access memory (RAM) 53, a timer 54, an analog-to-digital (A/D) converter 55, an output port 56, and a reset input port 57. The CPU 51 implements a battery temperature sampling operation, a BTG computing operation, a comparison operation, and other operations in accordance with programs stored in the ROM 52, Specifically, the CPU 51 samples battery temperatures at every predetermined interval. The output from the temperature measurement terminal 2e of the battery pack 2 is indicative of the battery temperature. The CPU 51 computes BTG values based on the current battery temperature and a previously detected battery temperature. A predetermined number of sampling times is interposed between these two battery temperatures used as a basis for the computation of BTG values Further, the CPU 51 determines that the battery pack 2 has reached a full charge condition while comparing the newly computed BTG value with a full charge discrimination value.

The RAM 53 has a battery temperature storage area 531, a correction value storage area 532, and a BTG value storage area 533. The battery temperature storage area 531 stores a predetermined number of recentmost battery temperatures. The oldest battery temperature amongst those stored in the storage area 531 is erased and the newly detected battery temperature is stored each time the battery temperature is detected. The correction value storage area 532 stores correction values used when the level of the charge current is switched to another level. The BTG value storage area 533 stores the BTG values ever computed.

The battery charger 3 also includes a switching power source. The switching power source is configured from a primary side rectifying/smoothing circuit 10 connected to a commercial 100V AC power source 1, a switching circuit 20 connected to the output of the circuit 10, and a secondary side rectifying/smoothing circuit 30. The primary side rectifying/smoothing circuit 10 includes a full-wave rectifying circuit 11 and a smoothing capacitor 12. The switching circuit 20 includes a high frequency transformer 21, a MOSFET 22 and a PWM control IC 23. The PWM control IC 23 is connected to the gate of the MOSFET 22 for adjusting output current from the secondary side rectifying/smoothing circuit 30 by changing width of the pulse applied to the MOSFET 22. The secondary side rectifying/smoothing circuit 30 includes diodes 31, 32, a choke coil 33, and a smoothing capacitor 34.

The battery charger 3 further includes a charge current control circuit. The charge current control circuit 60 has an input side connected to a current detecting resistor 4 which in turn is connected to the negative terminal 2d of the battery pack 2 via the negative terminals 3d of the battery charger 3. The output side of the circuit 60 is connected to the switching circuit 20 via a photocoupler 6. The circuit 60 includes cascade-connected operational amplifiers 61 and 62, an input resistor 63 and a feed back resistor 64 of the first-stage operational amplifier 61, and an input resistor 65 and a feed back resistor 66 of the second-stage operational amplifier 62. An instruction signal output from the output port 56 of the microcomputer 50 is applied to a charge current setter 80 and the output of the charge current setter 80 is applied to the inverting input terminal of the second-stage operational amplifier 62. The charge current setter 80 is provided to set the charge current in accordance with the instruction signal from the microcomputer 50 by changing the voltage applied to the inverting input terminal of the second stage operational amplifier 62. The charge current control circuit 60 controls the PWM control IC 23 to adjust the output current to match a current value set in the charge current setter 80.

The output port 56 of the microcomputer 50 is connected to the PWM control IC 23 through a photocoupler 5. A charge start/stop control signal is output from the output port 56 and applied to the PWM control IC 23. The PWM control IC 23 is actuated when the charge start control signal is applied and is deactuated when the charge stop control signal is applied.

The battery charger 3 includes a constant voltage source 70 connected to the commercial 100V AC power source 1 and supplies a positive DC voltage Vcc (5 V) to the microcomputer 1, the operational amplifiers in the charge current control circuit 60 and other circuits. The constant voltage source 70 includes a power source transformer 71, a full-wave rectifier circuit 72, a three-terminal regulator 74, a smoothening capacitor 73, and a reset IC 75. The reset IC 75 is connected to the reset input port 57 of the is microcomputer 50.

The battery charger 3 further includes a battery voltage detecting circuit 40, and a battery temperature detector 90. The battery voltage detecting circuit 40 is composed of two resistors 41 and 42 connected in series across the battery 2a. The voltage developed across the resistor 42 indicates the voltage across the battery 2a. The battery temperature detector 90 includes a detecting circuit which is composed of two resistors 91 and 92 connected in series between the positive voltage Vcc and ground. The thermistor 2b is connected in parallel to the resistor 92, so that the resistance of the thermistor 2b, which changes depending on the temperature of the battery pack 2, is translated into a voltage and the resultant voltage is input to the A/D converter 55 of the microcomputer 50.

In operation, when the battery pack 2 is loaded into the battery charger 3 for charging, the charge current control circuit 60 receives the current signal from the current detecting resistor 4 and feeds back the current signal to the PWM control IC 23 via the photocoupler 6. The PWM control IC 23 controls the switching duty of the MOSFET 22 to control the charge current supplied to the battery pack 2 to a level set in the charge current setter 80.

Figure 2:
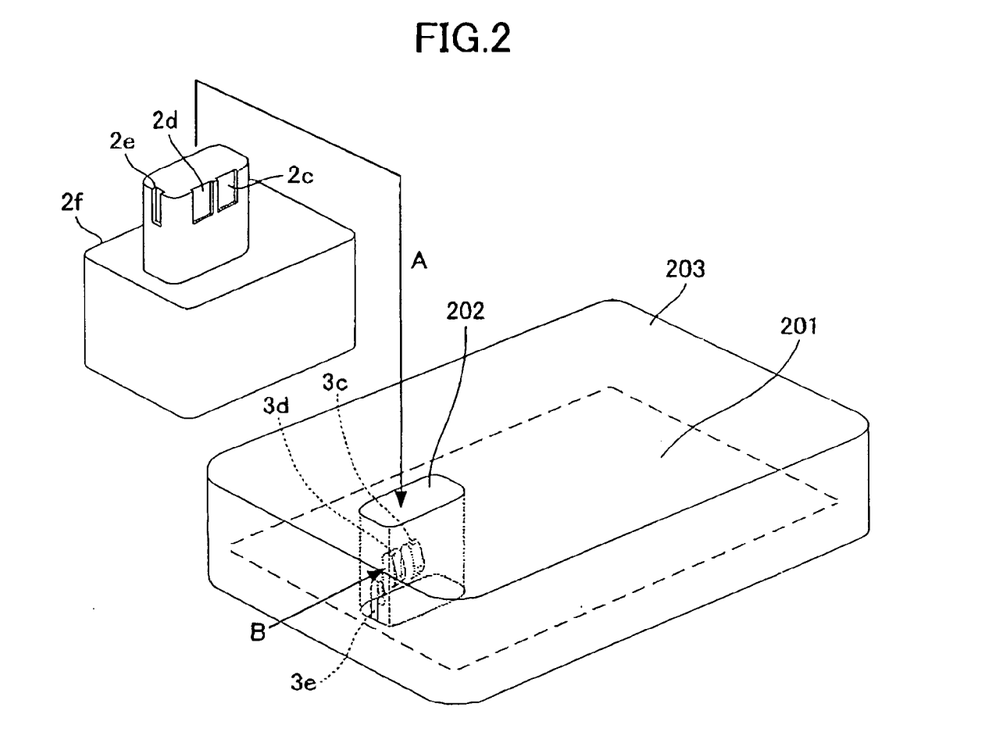
FIG. 2 is an explanatory perspective view showing the battery charger and the battery pack.

FIG. 2 shows an outer appearance of the battery pack 2 and the inner structure of a battery pack insertion recess 202 of the battery charger 3. The battery pack 2 has a casing 2f in which the battery 2a and the temperature sensor 2b are accommodated. The battery pack 2 is provided with an insertion portion. The terminals 2c, 2d, and 2e are exposed on the outer surface of the insertion portion. The battery charger 3 includes a casing 203 formed with the battery pack insertion recess 202. The insertion portion of the battery pack 2 is inserted into the insertion recess 202 as indicated by arrow A in FIG. 2. A substrate 201 on which the electrical circuit shown in FIG. 1 is mounted is accommodated in the casing 203. The electrical circuit is not depicted in FIG. 2. The terminals 3c, 3d and 3e of the battery charger 3 are provided on the substrate 201 and exposed within the battery pack insertion recess 202.

Figure 3A:
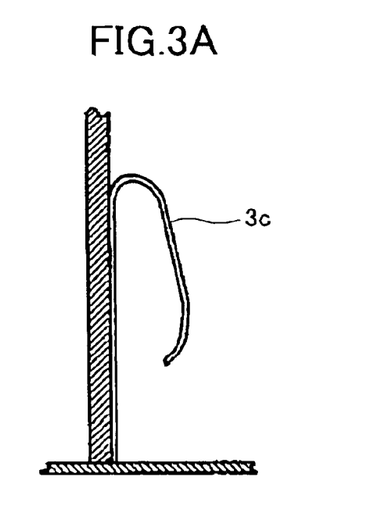
FIG. 3A shows a battery charger terminal as viewed from direction B in FIG. 2.
Figure 3B:
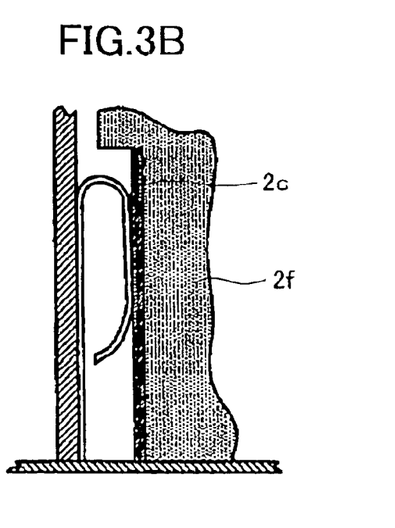
FIG. 3B shows the battery charger terminal in contact with a battery pack terminal.

FIG. 3A shows the positive terminal 3c of the battery charger 3 as viewed from direction B in FIG. 2. FIG. 3B shows a contacting condition in which the positive terminal 3c of the battery charger 3 is in contact with the positive terminal 2c of the battery pack 2. Each of the terminals 3c, 3d and 3e of the battery charger 3 is made of an elongated metal plate having a resiliency. As shown in FIG. 3A, the terminal 3c is folded and attached to the substrate 201. As shown in FIG. 3B, when the insertion portion of the battery pack 2 is inserted into the recess 202, the folded terminal 3c is inwardly pressed by the terminal 2c of the battery pack 2. The remaining terminals 3d and 3e of the battery charger 3 are similarly shaped and deformed.

Figure 4:
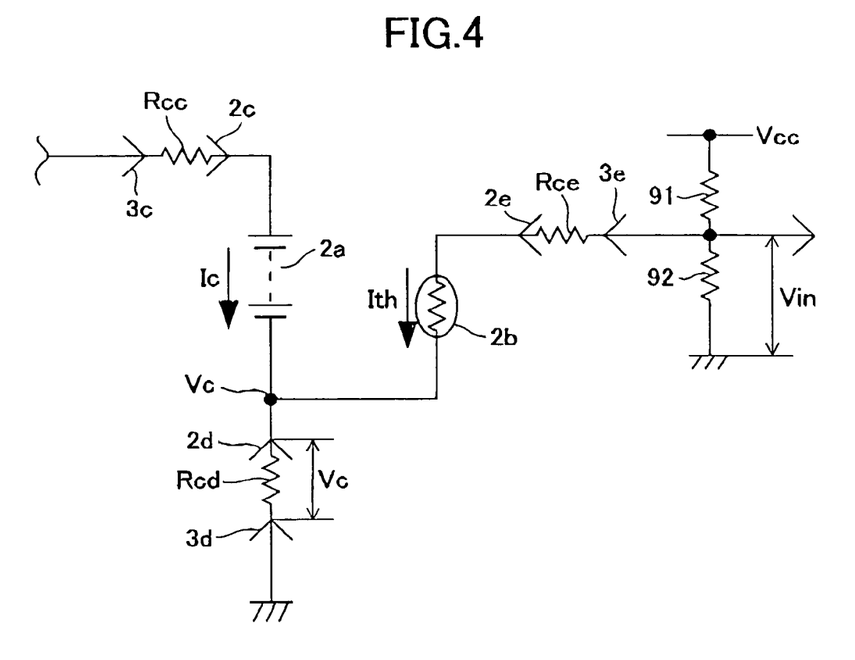
FIG. 4 is an equivalent circuit diagram of the battery charger and the battery pack in contact with each other.

As described previously, a contact resistance value become outstanding in the connection portion of the terminals as a result of secular change. FIG. 4 shows an equivalent electrical circuit of the connection portions. As shown, a contact resistance value Rcc exists between the positive terminal 3c of the battery charger 3 and the corresponding positive terminal 2c of the battery pack 2; a contact resistance value Rcd between the negative terminals 3d and 2d; and a contact resistance value Rce between the temperature measurement terminal 2e of the battery pack 2 and the temperature sensing terminal 3e of the battery charger 3.

It is now assumed that a current Ith flowing in the temperature sensor 2b is sufficiently small as compared with a charge current Ic flowing in the battery 2a. A contact voltage Vc given below is developed across a portion between the negative terminals 2d and 3d where the resistance value Rcd yields as contact resistance.

$$Vc = Rcd \times Ic \quad (1)$$

Representing the resistance value of the temperature sensor 2b with Rth, the input voltage Vin applied to the A/D converter 55 of the microcomputer 50 through the battery temperature detector 90 is given by the equation below.

$$Vin = R92 \cdot Rth \cdot Vcc/(R91 \cdot R92 + R92 \cdot Rth + Rth \cdot R91) + R91 \cdot R92 \cdot Vc/(R91 \cdot R92 + R92 \cdot Rth + Rth \cdot R91) \quad (2)$$

where R91 and R92 represent resistance values of resistors R91 and R92, respectively.

It can be appreciated from equation (2) that the input voltage Vin indicative of the battery temperature is influenced by the contact voltage Vc.

When the charge current is switched to a lower level, the contact voltage Vc decreases as can be seen from equation (1). The decrease of the contact voltage Vc also decreases the input voltage Vin as is clear from equation (2). When an NTC thermistor is used as the temperature sensor 2b, the temperature rise of the battery pack 2 decreases the input voltage Vin. Accordingly, the battery temperature is detected as being higher than an actual value it the charge current is switched to a lower level.

When the contact of the battery pack 2 with the battery charger 3 is perfect, a contact voltage Vc yielded in the contact portion is small enough so that influence of the contact voltage Vc on the input voltage Vin can be neglected. However, when the terminal contacting condition is no good due to abrasion or corrosion of the terminals, the influence of the contact voltage Vc on the input voltage Vin cannot be neglected. Although contact resistance exists in the contact portion of the positive terminal 2c and of the temperature measurement terminal 2e, the input voltage Vin is not affected by the contact resistances in those contact portions. The contact resistance Rce in the contact portion of the temperature measurement terminal 2e may be neglected because the current Ith flowing therein is extremely small as compared with the charge current. In addition, change in the level of current Ith is also very small, so is not significant.

Figure 5:
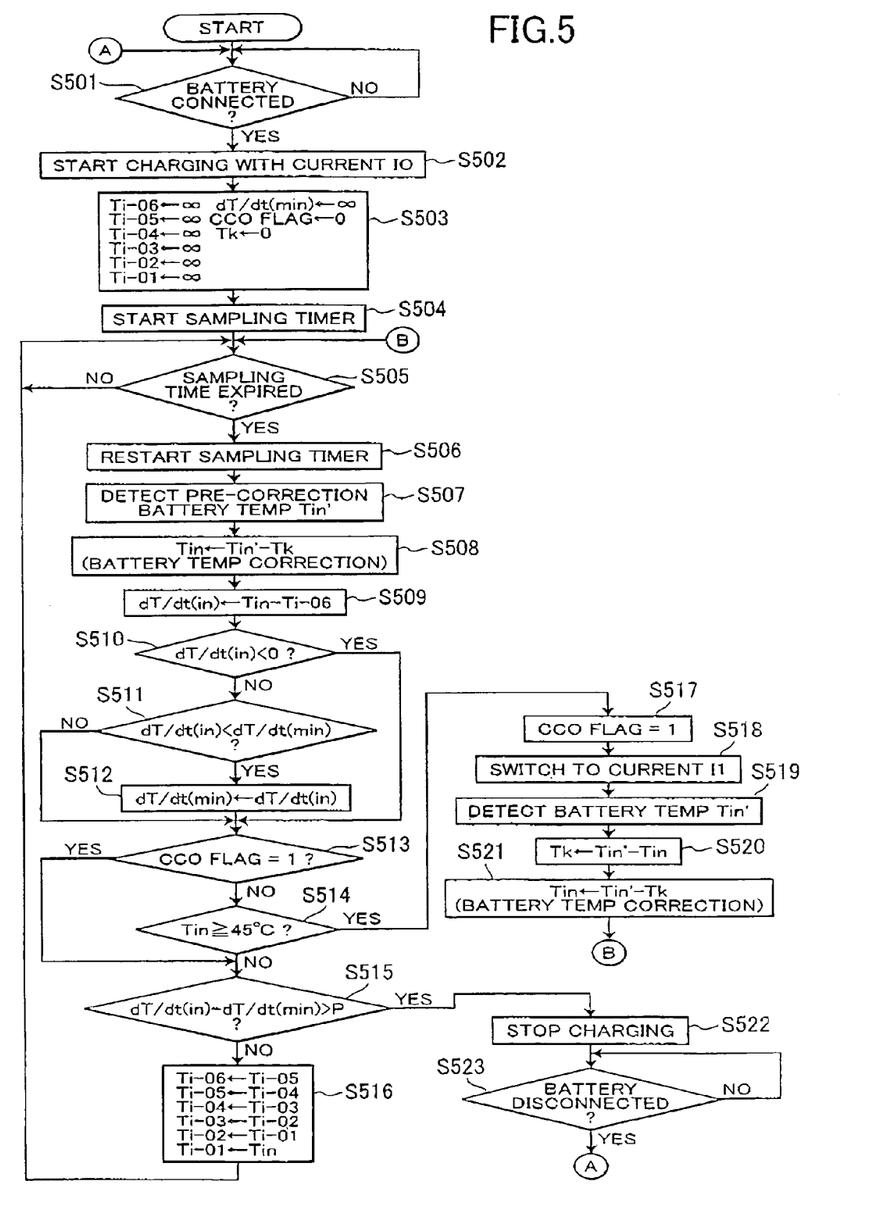
FIG. 5 is a flowchart showing steps in a method for controlling the battery charger of the preferred embodiment.
Figure 6A:
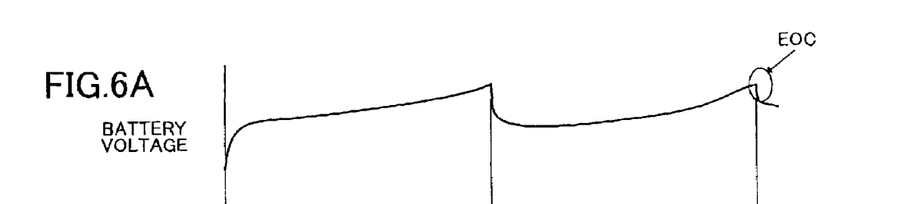
FIG. 6A is a time chart showing a change in battery voltage.
Figure 6B:
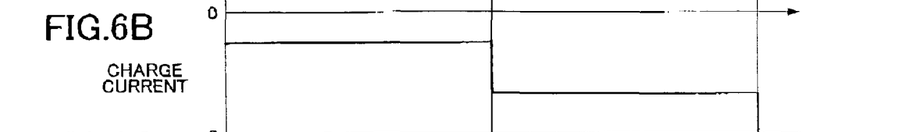
FIG. 6B is a time chart showing a change in charge current.
Figure 6C:
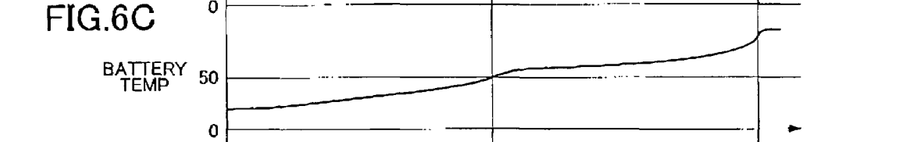
FIG. 6C is a time chart showing a change in battery temperature.
Figure 6D:
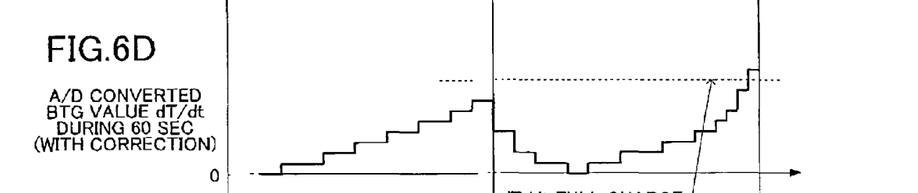
FIG. 6D is a time chart showing a change in analog-to-digital converted BTG value when correction of detected battery temperature values is performed.

Next, a method for controlling the battery charger will be described with reference to the flowchart in FIG. 5 and the time charts in FIGS. 6A through 6D. FIG. 6A shows change in battery voltage; FIG. 6B, change in charge current; and FIG. 6C, change in battery temperature. FIG. 6D shows the A/D converted BTG values which are computed according to the embodiment to be described later.

When the battery charger 3 is powered, the CPU 51 waits until the battery pack 2 is inserted into the battery pack insertion recess 202 of the battery charger 3 (S501). When the battery pack 2 is inserted into the insertion recess 202, the CPU 51 starts charging the battery pack 2 with a charge current I0 (S502). The time at which the charging the battery pack 2 starts is indicated by "0" on a time axis in FIGS. 6A through 6D.

Next, initial settings are performed on six recentmost battery temperature values Ti-06, Ti-05, . . . , Ti-01, a minimum BTG value dT/dt (min), a current changeover (CCO) flag, and a battery temperature correction value Tk (S503). It should be noted that the symbol ∞ in S503 of the flowchart indicates a maximum value amongst all possible A/D converted values. That is, the maximum A/D converted value is set to the various parameters. The six recentmost battery temperature values Ti-06, Ti-05, . . . , Ti-01 are stored in the battery temperature storage area 531. How the BTG value dT/dt (min) is computed will be described later. The minimum BTG value amongst ever computed BTG values is retained in the BTG value storage area 533.

Next, the sampling timer is started (S504). The timer 54 is used as the sampling timer. When a sampling time At has expired (S505:YES), the sampling timer is restarted (S506). In this embodiment, the sampling time Δt is set to 10 seconds.

The CPU 51 detects a pre-correction battery temperature Tin' (S507). The pre-correction battery temperature Tin' is an A/D converted value of the voltage developed across the resistor 92. Next, a battery temperature correction is performed (S508). A post-correction battery temperature Tin is computed by subtracting the correction value Tk from the pre-correction battery temperature Tin', i.e., Tin=Tin'−Tk (S508). It should be noted that before the level of the charge current is switched, the battery temperature correction does not need to be performed. Accordingly, the correction value Tk is set to 0 (Tk=0), thus Tin=Tin'.

Next, a BTG value dT/dt (min) is computed based on the post-correction battery temperature Tin corresponding to the newly detected pre-correction battery temperature Tin' and the oldest post-correction battery temperature Ti-06 detected and computed at a time six sample times ahead of the newly detected battery temperature (S509). In the following step, determination is made as to whether or not the thus computed BTG value dT/dt(in) is smaller than zero (S510). The determination made in S510 will be "YES" if six sampling times has not yet been expired from the time when the battery temperature detection is started. In this case, the routine jumps to S513. When the determination made in S510 reveals that the BTG value dT/dt (in) is not smaller than zero (S510: NO), then the newly computed BTG value dT/dt(in) is compared with the minimum BTG value dT/dt (min) retained in the BTG value storage area 533 (S511). If the newly computed BTG value dT/dt(in) is smaller than the minimum BTG value dT/dt(min) (S511:YES), the value retained in the BTG value storage area 533 is replaced with the newly computed BTG value dT/dt(in) and the latter value will be used as the updated minimum BTG value dT/dt(min) (S512). On the other hand, if the newly computed BTG value dT/dt(in) is not smaller than the minimum BTG value dT/dt(min) (S511:NO), the routine jumps to S513 where determination is made as to whether or not the CCO flag is "1". When the CCO flag is "1", the routine jumps to S515 in order to determine whether the battery pack 2 has reached a full charge condition.

When the CCO flag is not "1" (S513: NO), the CPU 51 determines whether or not the newly detected and corrected battery temperature Tin is above 45° C. (S514). This determination is made at time tb (see FIGS. 6A through 6D). When the newly detected and corrected battery temperature Tin is equal to or above 45° C. (S514:YES), the CCO flag is set to "1" (S517). If the battery temperature is as high as or more than 45° C., the cycle service life of the battery will be shortened. Therefore, in order to suppress temperature rise of the battery, the level of charge current is lowered to I1 (I0>I1) by controlling the charge current setter 80 (S518).

If the level of charge current is lowered, the detected battery temperature does not represent a real temperature due to change in ground level. In order to correct the detected battery temperature, the battery temperature Tin' immediately after the level of charge current is changed is detected (S519) to obtain a correction value Tk. The correction value Tk is computed by subtracting the battery temperature Tin detected immediately before the level of charge current is changed from the battery temperature Tin' (S520). Using the correction value Tk, a corrected battery temperature Tin is computed by subtracting the correction value Tk from the battery temperature Tin' and stored in the battery temperature storage area 531, whereupon the routine returns to S505.

It should be noted that a period of time needed to execute steps 519 through 521 is sufficiently short as compared with a sampling time of the battery temperature. When the battery temperature Tin is below 45° C. (S514:NO), the CPU 51 determines whether or not a value subtracting the minimum BTG value dT/dt(min) from the currently computed BTG value dT/dt is greater than a predetermined value P (S515). If the subtracted value is greater than the value P (S515: YES), then the battery pack 2 is determined to be fully charged and so charging the battery pack 2 is stopped (S522) The end of charge (EOC) occurs at time te in the time charts of FIGS. 6A through 6D, When the battery pack 2 is disconnected from the battery charger 3 (S523:YES), the routine returns to S501.

When the subtracted value, dT/dt(in)−dT(min), is equal to or less than the predetermined value P (S515:No), the six battery temperature values Ti-05, Ti-04, . . . , Ti-01 stored in the battery temperature storage area 531 are shifted to the storage locations where Ti-06, Ti-05, . . . , Ti-02 have been stored while expelling the oldest battery temperature value Ti-06 out of the storage area 531. The newly detected battery temperature Tin is stored as Tin-01.

While the invention has been described in detail with reference to specific embodiments thereof, it would be apparent to those skilled in the art that many modifications and variations may be made therein without departing from the spirit of the invention, the scope of which is defined by the attached claims.

In the above-described embodiment, the BTG values are computed based on the newly detected battery temperature and the battery temperature detected at a time six sample times ahead of the newly detected battery temperature. The BTG value may be computed using different data. For example, the BTG value may be computed using the battery temperature detected at a time twelve sample times ahead of the newly detected battery temperature. Although the described embodiment switches the level of charge current from I0 to I1 when the battery temperature has reached 45° C., the critical temperature is not limited to 45° C. The level of charge current may be lowered when the battery temperature has reached a temperature higher than 45° C. (for example, 50° C.) if the battery pack 2 can be cooled with a cooling fan provided in the battery charger 3. Further, the sampling time is not limited to 10 seconds but can be set shorter or longer than 10 seconds (for example, 5 seconds).

Figure 6E:
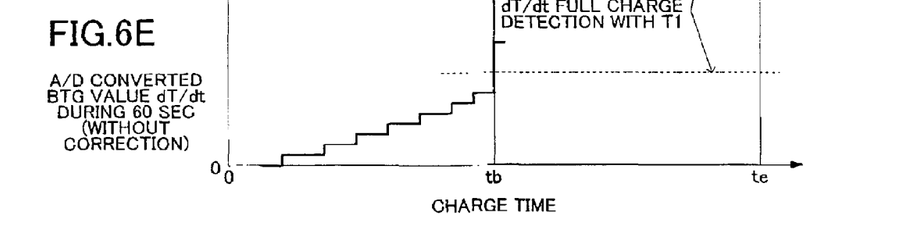
FIG. 6E is a time chart showing a change in analog-to-digital converted BTG value when correction of detected battery temperature values is not performed.

FIG. 6E shows a time chart showing the A/D converted BTG values which are computed without performing battery temperature correction. In this case, the subtracted value, dT/dt(in)−dT(min), has exceeded the predetermined value P immediately after the level of charge current is lowered. Hence, charging the battery pack 2 is stopped before the battery pack 2 has reached the full charge condition.

According to the described embodiment, with the computation of the BTG values dT/dt(in) using the corrected battery temperature values, the battery pack 2 can be adequately charged up to the full charge even if the contact condition between the battery pack 2 and the battery charger 3 becomes degraded as a result of secular change.

What is claimed is:

1. A battery charger for charging a battery pack having a battery, a temperature sensor for sensing a temperature of the battery, and a battery terminal, the battery charger comprising:
   a charger terminal to which the battery terminal is connected when the battery is charged;
   a charge current generating circuit that generates a charge current for charging the battery, the charge current having a level;
   a battery temperature detector that detects a temperature of the battery while cooperating with the temperature sensor and outputs a temperature signal indicative of the temperature of the battery; and
   a controller that is supplied with the temperature signal from the battery temperature detector, corrects the temperature signal, and provides a corrected temperature signal, the corrected temperature signal being substantially free from influence of contact resistance yielded in a contact portion of the battery terminal and the charger terminal.

2. The battery charger according to claim 1, further comprising a charge current control circuit that changes the level of the charge current, wherein the controller corrects the temperature signal when the charge current control circuit changes the level of the charge current to another level.

3. The battery charger according to claim 2, wherein the controller corrects the temperature signal using a correction value obtained from a first temperature signal detected by the battery temperature detector before the charge current control circuit changes the level of the charge current and a second temperature signal detected by the battery temperature detector after the charge current control circuit changes the level of the charge current.

4. The battery charger according to claim 3, wherein the correction value is equivalent to a value obtained by subtracting the first temperature signal from the second temperature signal.

5. The battery charger according to claim 4, wherein temperature signals detected by the battery temperature detector after the charge current control circuit changes the level of the charge current are corrected using the correction value, and the controller provides corrected temperature signals.

6. The battery charger according to claim 5, further comprising a first storage device that stores the corrected temperature signals.

7. The battery charger according to claim 4, wherein temperature signals detected by the battery temperature detector before the charge current control circuit changes the level of the charge current are not corrected using the correction value.

8. The battery charger according to claim 7, further comprising a first storage device that stores the temperature signals output from the battery temperature detector, wherein temperature signals detected by the battery temperature detector after the charge current control circuit changes the level of the charge current are corrected using the correction value, and the controller provides corrected temperature signals, the corrected temperature signal being further stored in the first storage device.

9. The battery charger according to claim 8, further comprising a second storage device for storing the correction value.

10. The battery charger according to claim 9, wherein the controller computes a battery temperature gradient based on two signals selected from the corrected temperature signals and temperature signals stored in the first storage device, and determines that the battery has reached a full charge condition based on the battery temperature gradient.

11. The battery charger according to claim 10, further comprising a third storage device that stores a minimum battery temperature gradient amongst ever computed battery temperature gradients.

12. The battery charger according to claim 11, wherein the controller determines that the battery has reached the full charge condition based further on the minimum battery temperature gradient stored in the third storage device.

13. A battery charger for charging a battery pack having a battery, a temperature sensor for sensing a temperature of the battery, and a battery terminal, the battery charger comprising:
   a charger terminal to which the battery terminal is connected when the battery is charged;
   means for generating a charge current for charging the battery, the charge current having a level;
   means for detecting a temperature of the battery while cooperating with the temperature sensor and for outputting a temperature signal indicative of the temperature of the battery; and
   controller means, supplied with the temperature signal from the battery temperature detecting means, for correcting the temperature signal, and providing a corrected temperature signal, the corrected temperature signal being substantially free from influence of contact resistance yielded in a contact portion of the battery terminal and the charger terminal.

14. The battery charger according to claim 13, further comprising a charge current control means for changing the level of the charge current, wherein the controller correcting means for the temperature signal when the charge current control means changes the level of the charge current to another level.

15. The battery charger according to claim 14, wherein the controller means includes means for correcting the temperature signal using a correction value obtained from a first temperature signal detected by the battery temperature detecting means before the charge current control means changes the level of the charge current and a second temperature signal detected by the battery temperature detecting means after the charge current control means changes the level of the charge current.

16. The battery charger according to claim 15, wherein the correction value is equivalent to a value obtained by subtracting the first temperature signal from the second temperature signal.

17. The battery charger according to claim 16, wherein temperature signals detected by the battery temperature detecting means after the charge current control circuit changes the level of the charge current are corrected using the correction value, and the controller means provides corrected temperature signals.

18. The battery charger according to claim 17, further comprising a first storage means for storing the corrected temperature signals.

19. The battery charger according to claim 16, wherein temperature signals detected by the battery temperature detecting means before the charge current control means changes the level of the charge current are not corrected using the correction value.

20. The battery charger according to claim 19, further comprising a first storage means for storing the temperature signals output from the battery temperature detecting means, wherein temperature signals detected by the battery temperature detecting means after the charge current control means changes the level of the charge current are corrected using the correction value, and the controller means includes means for providing corrected temperature signals, the corrected temperature signal being further stored in the first storage.

21. The battery charger according to claim 20, further comprising a second storage means for storing the correction value.

22. The battery charger according to claim 21, wherein the controller means includes means for computing a battery temperature gradient based on two signals selected from the corrected temperature signals and temperature signals stored in the first storage means, and for determining that the battery has reached a full charge condition based on the battery temperature gradient.

23. The battery charger according to claim 22, further comprising a third storage means for storing a minimum battery temperature gradient amongst ever computed battery temperature gradients.

24. The battery charger according to claim 23, wherein the controller means includes means for determining that the battery has reached the full charge condition based further on the minimum battery temperature gradient stored in the third storage means.

* * * * *